3,036,133
PROCESS FOR THE PREPARATION OF
SULFUR COMPOUNDS
Roland H. Goshorn, Fort Washington, Bernard Buchholz, Flourtown, and Thomas E. Deger, Ambler, Pa., assignors to Pennsalt Chemicals Corporation, Philadelphia, Pa., a corporation of Pennsylvania
Filed July 25, 1960, Ser. No. 45,188
15 Claims. (Cl. 260—609)

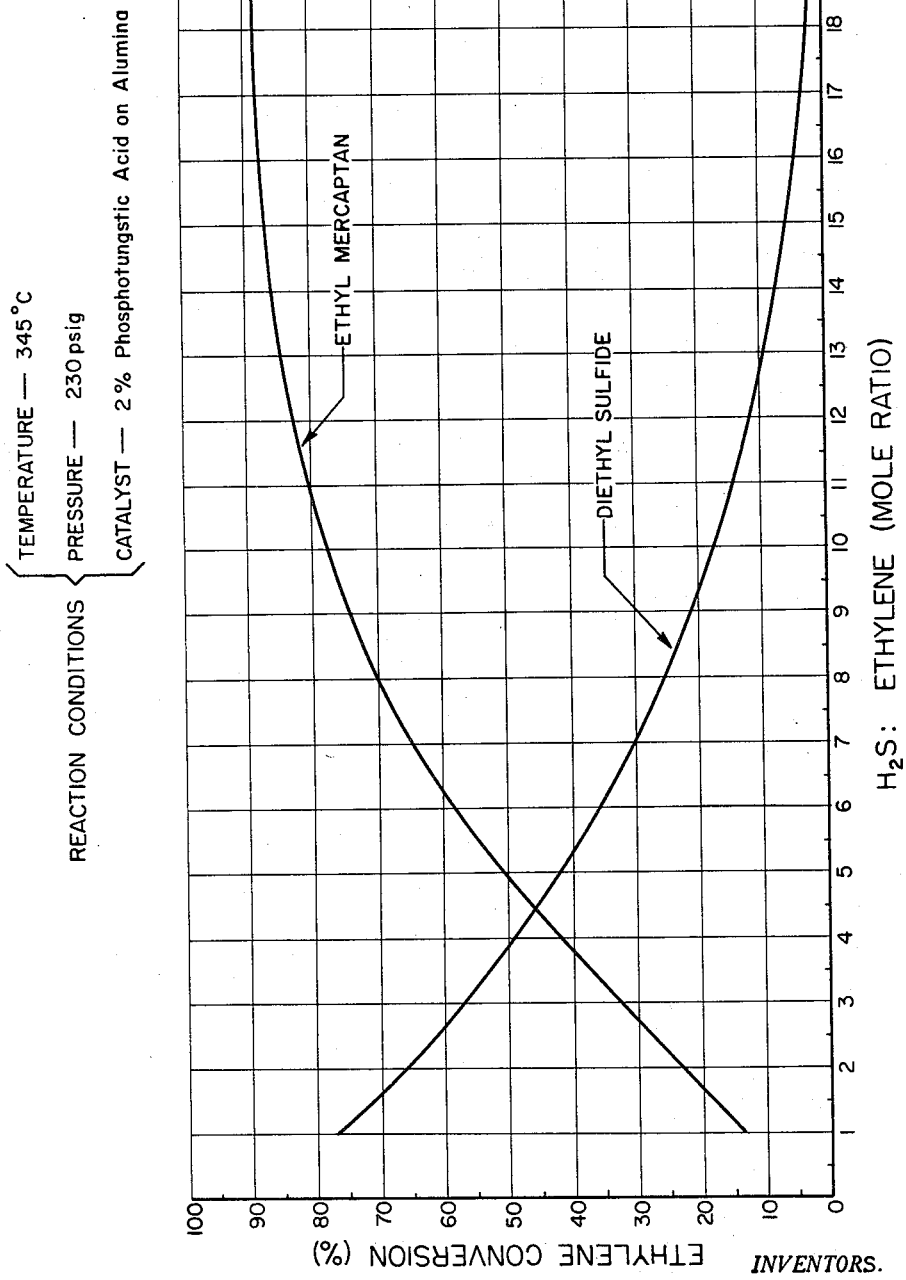

This invention deals with the preparation of ethyl mercaptan and diethyl sulfide by the reaction of ethylene with hydrogen sulfide in the presence of a catalyst. More particularly the process of this invention is directed to the preparation of ethyl mercaptan and diethyl sulfide by reacting ethylene with hydrogen sulfide in the presence of a catlayst comprising alumina or silica promoted with an activating amount of a compound taken from the group of heteropoly acids, their alkali metal salts, and their alkaline earth metal salts.

It is known in the art to react ethylene with hydrogen sulfide to obtain ethyl mercaptan and diethyl sulfide as products. Many catalysts have been disclosed for this reaction and the most common of these include alumina on silica, metal sulfides, and oxygen acids supported on a base (e.g. phosphoric acid on kieselguhr, tungstic acid on charcoal, etc.). All of the catalysts used heretofore have one or more serious disadvantages and a deficiency common to most of them is that they do not permit high conversions (i.e. over about 85%) to sulfur containing products. Two of the better catalysts used with olefins other than ethylene because they do permit relatively high conversions are phosphoric acid on kieselguhr and alumina on silica. However, when these catalysts are used for the ethylene-$H_2S$ reaction they suffer from a rapid decrease in activity. After about 30 hours the conversion to ethyl mercaptan falls from about 70% to 55% and lower; likewise, conversion to diethyl sulfide falls from about 11% to 3%. These catalysts also require, for optimum conversions to ethyl mercaptan (i.e. about 55–70%), that the ratios of $H_2S$ to ethylene used be very high (e.g. on the order of 30:1 or higher).

It has now been found that very high conversions of ethylene to ethyl mercaptan and diethyl sulfide products can be obtained in a single pass by reaction of ethylene with hydrogen sulfide when the catalyst used is a dehydration catalyst selected from the group of alumina and silica promoted with an activating amount of a compound taken from the class of heteropoly acids and their alkali metal and alkaline earth metal salts. In addition to obtaining high single pass conversions by the process of this invention, the catalyst life is surprisingly long. A still further advantage of the process of this invention is that high conversions to ethyl mercaptan are obtained using relatively low ratios of hydrogen sulfide to olefin reactant.

The catalyst used in the process of this invention is very specific. When it is used with olefins other than ethylene (e.g. propylene, butylene, etc.) the conversions to mercaptan and sulfide products are very low. Likewise when the heteropoly acid compound is deposited on materials other than alumina or silica, the conversions are poor. Furthermore, use of the heteropoly acid compound alone without the alumina or silica causes polymerization of the ethylene which results in unwanted by-products and low conversions to mercaptan and sulfide. This is particularly surprising, because a heteropoly acid (silicotungstic acid) used alone and unsupported for reaction of $H_2S$ with olefins of higher molecular weight than ethylene does enable rather high conversions to mercaptans to be obtained (about 80%). Thus ethylene, as the first member of the olefin series is not analogous to higher olefins in its reaction with hydrogen sulfide and this is in accord with the unconventional nature of the first members of many homologous series.

The catalyst for this novel process is prepared quite readily using conventional methods and procedures. Active alumina or silica is simply saturated with an aqueous solution containing a heteropoly acid or its alkali metal or alkaline earth metal salt, and the aqueous mixture is agitated thoroughly to insure even distribution. Then the liquid phase is removed and when dry the solid is ready for use. The amount of heteropoly acid or salt used will be such that from about 0.1% to 10% by weight of the final dry catalyst composite is the heteropoly acid compound. Preferably from about 0.5% to 5% will be used. The catalysts are easily handled and are stable to storage and after preparation and drying they have the physical appearance of the alumina or silica from which they are made. They may be granulated to various sizes and used in the conventional manner in conventional catalytic equipment. General methods for making these catalysts are also described in U.S. Pat. 2,886,515.

As indicated, the catalyst base will be an activated alumina or silica and such materials are well known and readily available. The activated aluminas are those sorptive aluminum oxides which usually have a surface area greater than about 10 sq. meters/gram. Some of these materials are obtained directly from bauxites or they may be made synthetically, as for example by calcination of alpha alumina trihydrate. Some specifically useful activated aluminas include Alcoa activated aluminas designated as Grade F, Grade H, X-21, and R-2396. Likewise activated silica is a well known article of commerce and is available as activated silica gel which is used frequently as a dehydration catalyst. Also useful in this invention are catalyst bases of silica-alumina and these too are commercially available.

The heteropoly acids and their salts used to make the catalysts of this invention are well known compounds. They are defined by Sidgewick in his book "The Chemical Elements and Their Compounds," vol. II, page 1042 (1940) and are those complicated structures in which a large number (usually 6, 9, or 12) of one acid residue (commonly molybdic or tungstic acid) is combined with a single residue of another acid selected from the group of oxyacids of boron, silicon, germanium, titanium, zirconium, thorium, phosphorus, vanadium, arsenic and manganese. These heteropoly acids are usually hydrated with a large, but definite number of water molecules, but the number may range from zero to as high as 70. They may be prepared readily by any of the methods given in "Inorganic Synthesis," vol. 1, 1st ed., pp. 129–133 (1939). Their alkali metal and alkaline earth metal salts are readily formed by reacting an aqueous solution of the acid with an alkali metal or alkaline earth metal hydroxide or carbonate (e.g. NaOH, KOH, Ba(OH)$_2$, Ca(OH)$_2$, Sr(OH)$_2$, K$_2$CO$_3$, Cs$_2$CO$_3$, Rb$_2$CO$_3$, etc.). Some common heteropoly acids which may be used in this invention are phosphotungstic acid, phosphomolybdic acid, silicotungstic acid, borotungstic acid and boromolybdic acid. Other useful heteropoly acids and their preparation are thoroughly discussed in U.S. Patent 2,886,515. This patent describes heteropoly acids in terms of a central acid forming element and outer acid forming elements. The outer acid forming elements will be regarded as those which are attached to the central acid forming element of the acid forming functional group in predominant number. The central acid forming element is any element which is at least trivalent and is capable of forming an oxygen containing compound which has acidic properties, and/or an analogous thio compound of acidic properties in which all or part of the oxygen atoms are replaced by sulfur. The outer acid forming elements are molybdenum, chromium, tungsten and vanadium. Many of the central acid forming elements can be selected from groups VA and VIA; whereas the outer acid forming elements can be chosen from groups VB and VIB of the periodic table. It is also contemplated employing heteropoly acids in which more than one outer acid forming element is present in the said functional group, as well as more than one central acid forming element is present therein. The central acid forming elements are, for example, phosphorus, germanium, tellurium, arsenic aluminum, boron, silicon, manganese, cobalt, rhodium, chromium, selenium, iodine, platinum, antimony, etc. Additional specific examples of heteropoly acids are, for example, molybdenum acid iodate, $H_2[I_2O_4(MoO_4)]\cdot 1H_2O$; molybdenum acid selenite, $3SeO_2\cdot 10MoO_3\cdot XH_2O$; molybdenum acid arsenate, $As_2O_5\cdot 18MoO_3\cdot 38H_2O$; $H_9[M^{III}(MoO_4)_6]\cdot XH_2O$ wherein X is 1 to 70 and M is a trivalent element selected from Al, Cr, Fe, Co, Mn or Rh; ammonium acid salt of aluminum molybdate, $(NH_4)_3H_6[Al(MoO_4)_6]\cdot 7H_2O$; molybdenum acid titanate, $TiO_2\cdot 12MoO_3\cdot 22H_2O$; molybdenum acid germanate, $GeO_2\cdot 12MoO_3\cdot 32H_2O$; molybdenum acid vanadate, $V_2O_5\cdot 8MoO_3\cdot 5H_2O$; ammonium acid salt of thiovanadate-thiomolybdate $$(NH_4)_5H_3[H_2(MoS_4)_4(VS_3)_2]\cdot 10H_2O$$

ammonium acid salt of nickelous molybdate $$(NH_4)_4H_6[Ni(MoO_4)_6]\cdot 5H_2O$$

ammonium acid salt of cupric molybdate $$(NH_4)_4H_6[Cu(MoO_4)_6]\cdot 5H_2O$$

ammonium salt of ferric molybdate $$(NH_4)_3H_6[Fe(MoO_4)_6]\cdot 7H_2O$$

ammonium salt of rhodium molybdate $$(NH_4)_3H_6[Rh(MoO_4)_6]\cdot 7H_2O$$

molybdenum acid platinate, $PtO_2\cdot 10MoO_3\cdot XH_2O$; chromium acid iodate, $2CrO_3\cdot I_2O_5\cdot 5H_2O$; ammonium acid salt of phospho-vanadate, $(NH_4)_5H_2[P(V_2O_6)_6]\cdot 21H_2O$; silicomolybdic acid, $H_4[SiMo_{12}O_{40}]\cdot XH_2O$, wherein X can be 5 to 29; phosphomolybdic acid $$P_2O_5\cdot 24MoO_3\cdot 63H_2O$$

phosphotungstic acid, $P_2O_5\cdot 24WO_3\cdot 63H_2O$; silicomolybdic acid, $SiO_2\cdot 12MoO_3\cdot 32H_2O$; silicotungstic acid $$SiO_2\cdot 12MoO_3\cdot 32H_2O$$

borotungstic acid, $B_2O_3\cdot 24WO_3\cdot 65H_2O$; aluminomolybdic acid, $H_{10}[Al(MoO_4)_6]\cdot 10H_2O$; and periodotungstic acid, $I_2O_7\cdot 12WO_3\cdot 11H_2O$. However, it is found that best results are obtained with those heteropoly acids containing tungsten as the outer acid forming element and the preferred heteropoly acid compounds for this process are phosphotungstic acid, silicotungstic acid, and their alkali and alkaline earth metal salts. The preferred catalyst for this process is alumina promoted with phototungstic acid.

In carrying out the process of this invention, the dry catalyst composite prepared as described above is simply charged into a reaction vessel (conveniently a cylindrical reactor which may be fixed or fluid bed reactor) and the reactant vapors of ethylene together with hydrogen sulfide vapors are passed through. The temperature at which the process will be operated will usually be between about 250° C. and about 400° C. Although reaction proceeds at temperatures below about 250° C., the space velocity of the gaseous reactants must be kept very low in order to obtain significant conversions and at such low space velocities the process is generally not economical. At temperatures above about 400° C., however, a high proportion of the ethylene is polymerized to tars and this, of course, is undesirable. Preferably, the process will be operated in the temperature range of 315° to 385° C.

The space velocity of the ethylene reactant may vary over a wide range. Space velocity is a measure of the rapidity with which the ethylene is passed through the effective reaction zone, i.e. the zone in which conditions such as temperature, presence of catalyst and the like, are conducive to reaction. The higher the space velocity, the more ethylene that passes through the reaction zone in a given time. For the process of this invention, the reaction zone is comprised of the catalyst bed, and the space velocity is measured as the gaseous volume of ethylene corrected to 0° C. and 1 atmosphere pressure per volume of catalyst per hour. Catalyst volume is taken as the gross volume of the catalyst bed. The space velocity for the reaction will usually be between about 25 and 150 cc./hr./cc. of catalyst, but may be 400 or more cc./hr./cc. of catalyst when the higher temperature (e.g. about 380° C.) are used. Conversely, at the lower temperatures of about 250° C. lower space velocities (say about 25 to 50 cc./hr./cc. of catalyst) will be used to obtain high conversion.

The process will be operated under a slight pressure of about 100 to 300 p.s.i.g., although pressures as high as 300 atmospheres or higher may also be used, but there is no need to exceed about 300 p.s.i.g. At pressures much below about 100 p.s.i.g., however (say at atmospheric pressure), the reaction is considered impractical for commercial use. Under the usual operating conditions the preferred pressure range is at least about 200 p.s.i.g.

The molar ratio of reactants may also vary widely and will determine whether mercaptan or sulfide is predominant in the reaction product. In order to obtain high conversion to mercaptan, the higher ratios of $H_2S$ to ethylene will be used. Conversely, to obtain high conversions to sulfide products, low ratios of $H_2S$ to olefin will be employed. Reference is made to the drawing FIGURE 1 which illustrates the conversions to mercaptan and sulfide obtained at various ratios of $H_2S$ to ethylene reactant at 345° C. and at 230 p.s.i.g. It will be seen that conversions of olefin to mercaptan of about 75% to 80% and above are obtained when the mole ratio of $H_2S$ to olefin is on the order of 10:1 and higher. The higher this ratio becomes, of course, the greater will be the conversion to mercaptan, but since optimum conversion appears to be around 85% to 90%, there is no need to use an $H_2S$ to olefin ratio higher than 20:1. Likewise an analysis of the curve shows that when diethyl sulfide is the desired product, conversions of about 75% to 80% are obtained with $H_2S$ to olefin ratios of 1:1 and below. Use of ratios between 1:1 and 20:1 will, of course, give mixtures of mercaptan and sulfide products in accord with the curves of the drawing, but it will be seen that total conversion of the ethylene to sulfur products is always 90% or higher. Although a mixture of mercaptan and sulfide is obtained as product of the process, separation to pure components is easily accomplished by distillation.

It will be understood that the above curve exemplifies only the conditions of temperature and pressure stated. Reaction pressure will also influence the conversion of olefin to mercaptan and at higher pressures the formation of the sulfide products is favored. In order to more fully illustrate the invention, the following examples are given.

EXAMPLE 1

A mixture of ethylene and hydrogen sulfide was passed over a catalyst consisting of 2% by weight of phosphotungstic acid on activated alumina in a continuous fixed bed reactor. An hourly olefin space velocity of 73 cc. of olefin per hour per cc. of catalyst was used. The reaction was exothermic and the temperature in the interior of the catalyst bed was somewhat higher than that indicated as the catalyst temperature in the table. When the reactor wall temperature was held at 345° C. with an ethylene space velocity of 73, a pressure of 230 p.s.i.g., in a 3:1 molar $H_2S$ to ethylene ratio, the interior of the catalyst bed was 20–30° C. hotter than the reactor wall temperature. Under the same operating conditions, with a 1:1 molar $H_2S$ to ethylene ratio the catalyst interior was found to be 25–40° C. higher.

The following table illustrates the data obtained.

Table I

| Run | Reactor Temp., °C. | H₂S:C₂H₄ Mole Ratio | Pressure, p.s.i.g. | Percent Conversion Ethylene to C₂H₅SH | Percent Conversion Ethylene to (C₂H₅)₂S | Total Percent Ethylene Converted |
|---|---|---|---|---|---|---|
| (a) | 295 | 3:1 | 135 | 27 | 13 | 40 |
| (b) | 300 | 3:1 | 135 | 31 | 28 | 59 |
| (c) | 313 | 3:1 | 135 | 39 | 40 | 79 |
| (d) | 322 | 3:1 | 135 | 42 | 41 | 83 |
| (e) | 345 | 3:1 | 135 | 39 | 46 | 85 |
| (f) | 345 | 6:1 | 135 | 59 | 19 | 78 |
| (g) | 355 | 6:1 | 135 | 60 | 21 | 81 |
| (h) | 365 | 6:1 | 135 | 58 | 22 | 80 |
| (i) | 345 | 1:1 | 230 | 14 | 76 | 90 |
| (j) | 345 | 3:1 | 230 | 33 | 57 | 90 |
| (k) | 345 | 8:1 | 230 | 70 | 25 | 95 |

The data in the above table show the means of controlling the predominance of mercaptan or sulfide product by control of the H₂S:C₂H₄ mole ratio. On comparing runs (e) and (f) it is seen that doubling the H₂S:C₂H₄ mole ratio from 3:1 to 6:1 increased the conversion to mercaptan by 20%. This effect is also seen in runs (j) and (k) where at higher pressures an increase of the H₂S:C₂H₄ ratio from 3:1 to 8:1 more than doubled the mercaptan formation.

The catalyst of the above system was used for more than 100 hours and with any set of reaction conditions it actually showed slight increases in total conversions with continued use.

Separation of the ethyl mercaptan and diethyl sulfide was achieved easily by distillation in the usual manner yielding high purity products.

EXAMPLE 2

Using a 6:1 mole ratio of H₂S:ethylene, a reactor temperature of 355° C., a space velocity of 37, and a pressure of 175 p.s.i.g., ethylene and hydrogen sulfide were reacted over a catalyst of 2% silicotungstic acid on alumina. Ethylene was 90% converted to a mixture of ethyl mercaptan and diethyl sulfide, the conversion of ethylene being approximately 45% to each component.

EXAMPLE 3

The procedure of Example 2 was repeated using a space velocity of 20 and a catalyst of 2% phosphotungstic acid on activated silica. Conversion of ethylene was 90% resulting in a mixture of ethyl mercaptan and diethylsulfide, the conversion to ethyl mercaptan being about 60%.

EXAMPLE 4

Mixtures of ethylene and H₂S were preheated at 400° C. and then passed over a 2% potassium phosphotungstate on alumina catalyst in a continuous fixed-bed reactor. The catalyst temperature was maintained at 355° C. and the pressure was 175 p.s.i.g. The ethylene hourly space velocity was 37 cc. of vapor/hr./cc. catalyst. The following results were obtained.

| H₂S:C₂H₄ mole ratio | Percent Conversion to C₂H₅SH | Percent Conversion to (C₂H₅)₂S | Total Conv'n to mercaptan and sulfide | Percent Yield |
|---|---|---|---|---|
| 8:1 | 66 | 26 | 92 | 99 |
| 6:1 | 53 | 36 | 89 | 95 |

When calcium phosphotungstate is used in the above example essentially the same results are obtained.

EXAMPLE 5

Following the procedure of Example 1, butene-1 and hydrogen sulfide were reacted over a 2% by weight phosphotungstic acid on alumina catalyst at 300° C., at a mole ratio of H₂S:butene-1 of 6:1, at a pressure of 135 p.s.i.g. and at a space velocity of 55. The total conversion of the olefin to sulfur containing products was only 10.1% and consisted of 9.2% secondary butyl mercaptan and 0.9% of sulfide. When operated at 100° C. the process gave no mercaptan product.

In like manner, reaction of propylene tetramer with H₂S with the same catalyst at 135 p.s.i.g. pressure, a 4:1 H₂S:olefin mole ratio, at a space velocity of 23 and at varying temperatures gave only small amounts of products consisting essentially of mercaptan as shown in the following table:

Table II

| Reactor Temperature, °C. | Percent Conversion of Propylene Tetramer to tert-C₁₂H₂₅SH |
|---|---|
| 50 | 2.0 |
| 85 | 3.5 |
| 130 | 8.0 |
| 150 | 11.5 |
| 220 | 7.7 |
| 250 | 6.2 |
| 300 | 5.7 |

EXAMPLE 6

Example 2 was repeated but using a catalyst of 2% silicotungstic acid on activated carbon. The ethylene was converted only 65%; conversion to ethyl mercaptan and diethyl sulfide being about equal.

It is evident from the above examples and data that the excellent conversion of ethylene to sulfur containing products is achieved only by use of the unique catalyst system of alumina or silica promoted with the heteropoly acid compound. Furthermore, it is clear that the advantages of this novel process in (a) achieving high conversions, (b) having a catalyst system with long life, (c) using relatively low H₂S to olefin ratios, and (d) providing a low cost, easily prepared catalyst make this process a valuable contribution to the art.

It will be obvious to the skilled artisan that many changes may be made from the above description and examples without departing from the spirit and scope of the invention and accordingly the invention is not to be limited except by the following claims.

We claim:

1. The process of reacting hydrogen sulfide with ethylene at a temperature below about 400° C. in the presence of a catalyst comprising a dehydration catalyst selected from the group of alumina and silica promoted with an activating amount of a compound selected from the group of heteropoly acids, alkali metal salts of heteropoly acids, and alkaline earth metal salts of heteropoly acids.

2. The process of reacting hydrogen sulfide with ethylene in the presence of a catalyst comprising a member of the group consisting of alumina and silica promoted with from 0.1% to 10% by weight of the catalyst of a compound selected from the group of heteropoly acids and alkali metal and alkaline earth metal salts of heteropoly acids, said process being carried out at a temperature between about 250° C. and 400° C., at a pressure of at least about 100 p.s.i.g. and at a mole ratio of H₂S:ethylene between about 1:1 and 20:1.

3. The process of reacting hydrogen sulfide with ethylene in the presence of a catalyst comprising a member of the group consisting of alumina and silica promoted with from 0.5% to 5% by weight of the catalyst of a compound selected from the group of heteropoly acids containing tungsten as the outer acid forming element and alkali metal salts of said heteropoly acids, said process being carried out at a temperature between about 250° C. and 400° C., at a pressure of at least about 100 p.s.i.g., at a mole ratio of H₂S:ethylene between about 1:1 and 20:1 and at an ethylene space velocity of at least about 25 cc. of ethylene per hour per cc. of catalyst.

4. The process of claim 3 wherein the heteropoly acid compound is selected from the group of phosphotungstic acid and its alkali metal salts.

5. The process of claim 3 wherein the heteropoly acid compound is silicotungstic acid.

6. The process of claim 3 wherein the heteropoly acid compound is sodium phosphotungstate.

7. The process of claim 3 wherein the heteropoly acid compound is phosphotungstic acid.

8. The process of claim 3 wherein the catalyst is alumina promoted with the heteropoly acid compound.

9. The process of claim 3 wherein the catalyst is silica promoted with the heteropoly acid compound.

10. A process for the preparation of ethyl mercaptan which comprises reacting hydrogen sulfide and ethylene in the presence of a catalyst comprising alumina promoted with from 0.5% to 5% by weight of the catalyst of a compound selected from the group of silicotungstic acid, phosphotungstic acid and their alkali metal salts, said process being carried out at a temperature between about 300° C. and 400° C., at a pressure above 100 p.s.i.g., at an $H_2S$:ethylene mole ratio of at least about 10:1, and at an ethylene space velocity of at least about 25 cc. of ethylene per hour per cc. of catalyst.

11. The process of claim 10 wherein the alumina is promoted with phosphotungstic acid.

12. The process of claim 10 wherein the alumina is promoted with silicotungstic acid.

13. The process of claim 10 wherein the alumina is promoted with sodium phosphotungstate.

14. A process for the preparation of ethyl mercaptan which comprises reacting hydrogen sulfide and ethylene in the presence of a catalyst comprising silica promoted with from about 0.5% to 5% by weight of a compound selected from the group of phosphotungstic acid, silicotungstic acid, and their alkali metal salts, said process being carried out at a temperature between about 300° C. and 400° C., at a pressure above 100 p.s.i.g., at an $H_2S$:ethylene mole ratio of at least 10:1, and at an ethylene space velocity of at least about 25 cc. of ethylene per hour per cc. of catalyst.

15. The process of claim 14 wherein the silica is promoted with phosphotungstic acid.

References Cited in the file of this patent

UNITED STATES PATENTS

| | | |
|---|---|---|
| 2,052,268 | Williams et al. | Aug. 25, 1936 |
| 2,101,096 | Reuter et al. | Dec. 7, 1937 |
| 2,386,774 | Badeetscher | Oct. 16, 1945 |

OTHER REFERENCES

Langhout et al.: J. Applied Chem., 4 (6), 285–288 (1954).